United States Patent

List et al.

[15] 3,653,014
[45] Mar. 28, 1972

[54] SIGNAL VARIATION ENHANCEMENT SYSTEM

[72] Inventors: William F. List, Linthicum; Roland A. Anders, Baltimore, both of Md.

[73] Assignee: Westinghouse Electric Corporation, Pittsburgh, Pa.

[22] Filed: Dec. 24, 1969

[21] Appl. No.: 887,861

[52] U.S. Cl. ........................340/203, 178/DIG. 3, 250/209, 328/163
[51] Int. Cl. .........................................................G08b 29/00
[58] Field of Search ...............340/203; 250/209; 179/15 AP, 179/15 AC, 15 AV, 15 LL; 178/DIG. 3; 328/163; 325/38 B, 475

[56] References Cited

UNITED STATES PATENTS 3,473,131   10/1969   Perkins, Jr. ...........................328/163
3,462,547   8/1969    Macovski...............................178/6 X

*Primary Examiner*—John W. Caldwell
*Assistant Examiner*—Michael Slobasky
*Attorney*—Brufsky, Staas, Breiner and Halsey

[57] ABSTRACT

Apparatus is disclosed for enhancing small signal information level variations detected by an array of sensors. The sensors convert detected energy, such as light, to a form suitable for processing, e.g., representative electrical signals. The signals are sequentially sampled according to a predetermined sequence of scanning of the sensing element array, and are processed in parallel channels on a synchronized element-by-element basis to detect variations in sample levels. The detected variations are converted to logarithmic form to emphasize small signal variations from element to element.

9 Claims, 2 Drawing Figures

INVENTORS
WILLIAM F. LIST &
ROLAND A. ANDERS

SIGNAL VARIATION ENHANCEMENT SYSTEM

BACKGROUND OF THE INVENTION

1. Field of the Invention

The present invention relates generally to the detection of small signal variations in the presence of obscuring background phenomena, and in particular to the emphasis of small signal variations regardless of the magnitude of the average signal level with respect to which the variations occur.

2. Prior Art Considerations scanned or sensed

It is frequently desirable to detect small signal level variations in the presence of background interference, and this is usually achieved by means of specialized filter circuit arrangements or similar means which will serve to reduce the background level, thereby emphasizing or enhancing the information signal level to be detected. One practical situation in which this problem arises is in imaging systems where it is desired to detect relatively slight variations in apparent contrast of portions of a scene being scanned by a point-by-point image converter. It may be necessary to recover relatively obscure information from a scene containing both brightly illuminated regions and dimly illuminated regions. An example of such a scene is a field of view containing a highly a highly reflective foreground, such as white sandy beach, and a light-absorbent background, such as a dark wooded area, so that quite clearly the contrast between foreground and background is substantial. The presence of a specific object of interest in this scene contributes to the variation in intensity of light incident on photo sensors of an image converter viewing the scene. A low level of light is reflected from the background, a much higher light level is reflected from the foreground, and light at a level between the two is reflected from the object of interest. Depending upon the reflective characteristics of the object of interest, then, the signals generated by the photo sensors (e.g., in a linear array) in response to the object-reflected light may be less than or greater than the signals resulting from the background regions (and, in this context, the term "background" is intended to refer to both foreground and background of the scene). Between the limiting cases of an object having greater reflectivity than the surrounding background, and an object having less reflectivity than the background, there is found a myriad of other possibilities of relative reflectivity and absorptivity of incident light.

In most situations of practical interest, the relative reflectivity between the object of interest and the surrounding background approaches equality so that the resulting differences in reflectivity between the object and its environment tend to be rather small. Regardless of this, however, it is quite possible for the gross variation in signal level, that is, the relative difference between extremes derived from the overall scene, to be substantial. This is particularly true where the illumination of objects varies throughout the scene, as where an extensive region of the scene is in heavy shadow.

Normal imaging system techniques call for signal handling based on an exponential distribution of signal level intensities, typified, for example, by the gray scale in which a shade of gray is defined as $\sqrt{2}$ times the intensity of the next preceding level. Such a sequence of gray shades constitutes the basis of aperture stop arrangements for a typical camera lens system. These conventional imaging systems require larger absolute differences where a brightly lighted scene is encountered, in order to effect a shade of gray difference, than where the scene is dimly or at least less brightly illuminated.

A line of sensors, such as a strip of photoelectric detectors, is quite capable of detecting arbitrarily small incremental information signal variations, but conventional signal classifying techniques do not admit of recovery of these very small signal variations from one extreme end of a range of levels to the other. Where linear processing is utilized, it is difficult to obtain an indication of extremely small signal separated by a large step signal, and limitations are imposed on dynamic range of the input. Logarithmic processing makes it possible to amplify the small signal end of the signal level range to detect and indicate some of the relatively small changes which may occur there. However, ordinary logarithmic processing also tends to reduce the small variations which may occur throughout the remainder of the signal range, because the difference between signal levels is a function of the ratio of respective power levels of the signals.

A further approach to processing of signal information in which very small signal changes may occur throughout the range, is to add a bias or offset signal to the output of the sensors, to produce a new composite signal. By using this technique, signal levels which are larger than the bias level will produce a positive output, whereas signal levels less than the bias level will produce a negative output. The point at which the two signals are equal corresponds to a zero level, and hence, either linear or logarithmic amplification may be utilized to process the small signal changes of interest around this bias level.

While such a technique has proven effective in displaying very small signal variations at a known, specific signal level, the disadvantage of the technique is its capability of use for only a range about the bias level. It cannot be used to detect variations occurring at both extremes, i.e., at high and low levels, of the range, nor to cover the entire range of levels.

Accordingly, it is a principal object of the present invention to provide a signal detection system which is capable of emphasizing low level variations in an information-bearing format.

It is another object of the invention to provide apparatus for emphasizing information signal variations regardless of the small magnitude of those variations and regardless of the average signal level at which such variations may occur.

SUMMARY OF THE INVENTION

Briefly stated, according to the present invention, a signal level representative of a detected parameter, such as light intensity, is applied to a parallel circuit combination consisting of a first path with a linear relatively wide band filter having a bandwidth ranging from approximately DC to a preselected signal sampling rate, and a second, parallel path with a non-linear narrow band filter having a bandwidth centered about the signal sampling rate. The narrow band filter is selected to have characteristics that will result in an emphasis of small signal changes, over large signal changes, the latter being typically confined to the first channel, and to provide such emphasis regardless of the average signal level at which the small signal changes may occur.

In a preferred embodiment, this operation is obtained in a system having a plurality of sensors for detecting variations in a form of energy desired to be detected, the sensor outputs being sampled in a sequential timed manner. The output levels of adjacent sensors are supplied to a pair of parallel, alternately actuated channels in which the sample levels are cumulatively held over the period occupied by a complete scan of the sensors, and the stored levels in the two channels are compared at the conclusion of each sampling interval by application to a differencing circuit. The difference between accumulated samples obtained from successive sensors along the line is converted to logarithmic form to assist in providing the desired emphasis of small signal changes, and the logarithmic difference signals are subjected to successive addition, or integration, over an interval equal to the overall sampling period for an entire scan of the line of sensors.

The effect of this signal processing technique is to examine sample levels from the array of sensing elements on an element-by-element basis, and to compare the sample level obtained from each sensing element with that obtained from the next consecutive element in the array (for example, a strip of sensors), and also to compare the levels of groups of alternating ones of the sensing elements in an accumulative manner. Such a technique magnifies the small changes in signal level occurring from element-to-element; in part because after the initial examination and comparison of sample levels, the difference signals which represent accumulating contrast between those levels are converted to logarithmic form. The logarithmic signal amplitude variations are, by their very nature, much larger for small signal differences than for large signal differences. Further emphasis occurs as a result of the subsequent integration of these logarithmic signal amplitude variations. Furthermore, the enhancement of very small absolute input signal level variations occurs over the entire dynamic range of the sensors, with acceptable distortion of the signal modulation.

BRIEF DESCRIPTION OF THE DRAWING

In describing the preferred embodiments of the invention, reference will be made to the following figures of drawing, in which.

DESCRIPTION OF THE PREFERRED EMBODIMENT

Figure 1:
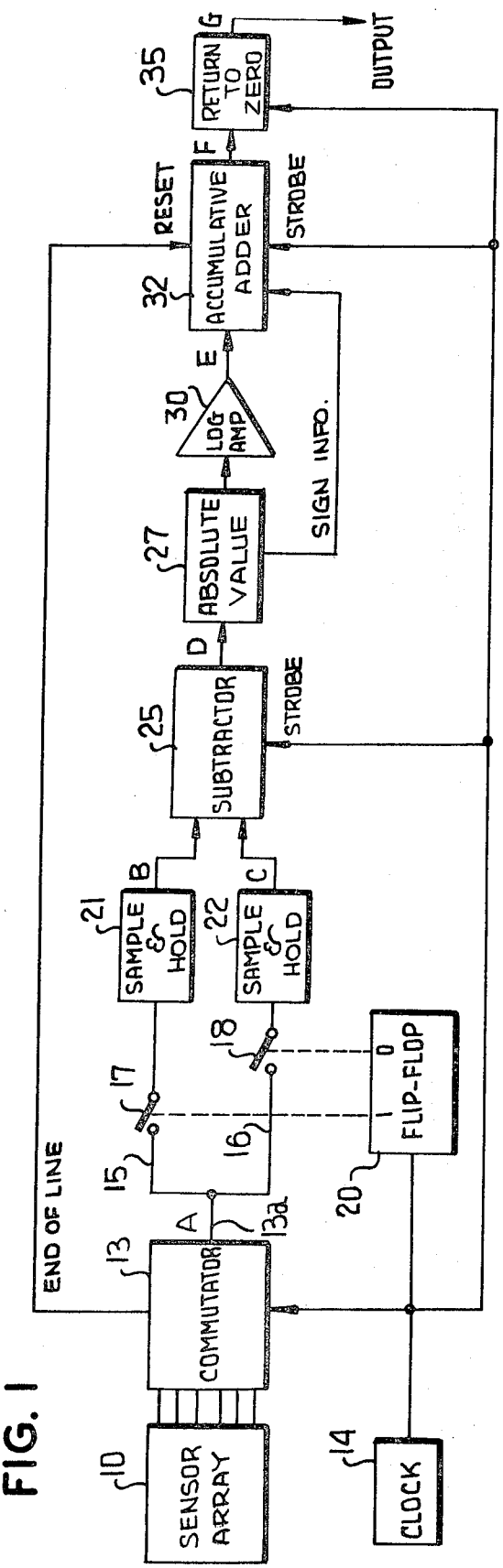
FIG. 1 is a block diagram of a preferred embodiment of the invention for use in an imaging system to provide image contrast enhancement.

With reference now to FIG. 1, apparatus for enhancing image contrast in a solid state imaging system includes a sensor array 10 which may comprise a linear array (e.g., a strip) of photosensors, each of the sensors in the line being exposed to light from a source under observation. The sensors are of the photoelectric type to develop electrical signals functionally related to respective levels of incident light, each sensor generating signal on a separate and distinct associated output line. According to the present invention, these output signals are commutated or multiplexed into a single line or channel 13a for further processing. To that end, a commutator 13 is provided to sequentially connect each output line to single line 13a for a specific time interval, thereby producing a serial time-divided signal containing sequential samples of signals generated by all of the sensing elements in the array, over a complete scan.

Figure 2:
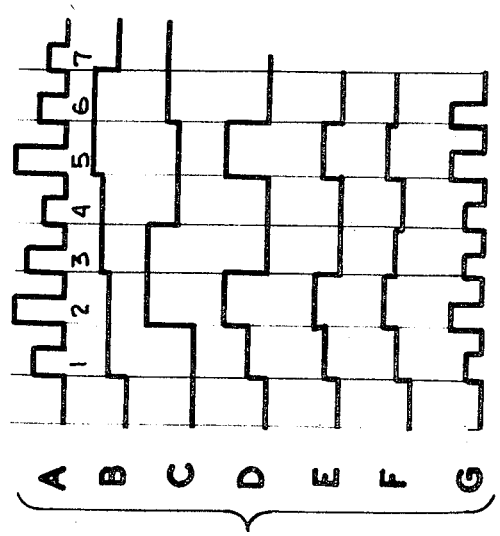
FIG. 2 is a set of waveforms occurring at various points in the system of FIG. 1.

A typical example of the multiplexed output samples of the sensor array or strip 10 is shown in FIG. 2A. In the latter figure, the separate pulses appearing in the sequence numbered 1-7 represent samples of output signal appearing on line 13a, taken from the several output lines of the sensor array in the sequence of scanning by commutator 13. Preferably, the output of the commutator is supplied to a suitable buffer and amplifier stage (not shown) prior to further processing, but the need for such a stage will, of course, depend upon the magnitude of the output signals produced by the sensors, upon the operation of the commutator to provide sharp, well-defined sample pulses on the output line 13a, and upon the impedance match between output of the commutator and input of succeeding circuitry.

The multiplexed signal of the type shown in FIG. 2A is applied to a pair of processing channels connected in parallel, each of the channels containing a sample and hold circuit. One of the two channels, 15, has normally open switch 17, upon closure of which the incoming signal is applied to a sample and hold circuit 21; and the other channel, 16, has a normally open switch 18, upon closure of which the incoming signal is applied to a sample and hold circuit 22. During processing of the signal, the switches 17 and 18 are opened and closed in alternation, so that when switch 17 is open, switch 18 is closed, and vice versa. Suitable control of the switches is exercised by a flip-flop or bistable multivibrator 20 synchronized with the operation of commutator 13 by clock 14. Quite clearly, while switches 17 and 18 are represented as being mechanical in nature, this is purely a matter of convenience in illustration, since it is apparent that electromechanical or electronic switches may alternatively be employed, and preferably are employed, for use in conjunction with flip-flop 20.

By virtue of the synchronized operation of commutator 13 and flip-flop 20, the first pulse in the multiplexed signal, that is, the output pulse of the first sensor being scanned in strip 10, is applied via switch 17 through channel 15 to sample and hold circuit 21, assuming that flip-flop 20 is then in its "1" state during that interval. Upon occurrence of the next clock pulse, which acts as a trigger pulse to flip-flop 20, the flip-flop is switched to its "0" state, simultaneously with the connection of the output line associated with the second sensor to line 13a by commutator 13. As a consequence of the change of state of flip-flop 20, switch 17 reverts to the open state, while switch 18 is now closed. Accordingly, the second sample pulse in the train shown in FIG. 2A is applied via channel 16 to sample and hold circuit 22. A similar operation occurs with each succeeding pair of pulses, as first one pulse is applied to sample and hold circuit 21 and the next succeeding pulse is applied to sample and hold circuit 22.

Typical outputs of sample and hold circuits 21 and 22 are shown in FIG. 2B and C, respectively, for inputs such as shown in FIG. 2A. Clearly, each pulse applied to a particular sample and hold circuit will either increase or decrease the accumulated level of pulses then stored within that sample and hold circuit, depending respectively upon whether the incoming pulse is of higher level or lower level than the present magnitude of the contents of the sample and hold circuit.

The outputs of the two sample and hold circuits 21 and 22 are compared (as outputs B and C), at each sampling (clock) interval, in a differencing circuit or subtractor 25. Operation of subtractor 25 is synchronized with the operation of commutator 13 and flip-flop 20 by clock pulses from clock 14. The output of subtractor 25, labeled D in FIG. 1, is shown in exemplary form in FIG. 2D for the case where the inputs to the subtractor are those shown in FIGS. 2B and C. The resultant difference signal, that is, the output of subtractor 25, is applied to a logarithmic amplifier 30 to obtain a signal representing the logarithm of the difference. However, since the difference signal may be negative, and since negative logarithms are undefined, negative difference signals must be handled in such a manner to permit sign information to be obtained for subsequent processing of the signal. To that end, an absolute value circuit 27 is interposed between the subtractor 25 and the logarithmic amplifier 30 to derive the absolute value of the incoming difference signal from the subtractor, and the sign information is supplied separately for reinsertion and use at a subsequent point in the processing of signal information. The output of logarithmic amplifier 30 is a train of pulses as shown in FIG. 2E, for an input derived from the previously discussed waveforms, and corresponds to the logarithms of the respective difference signals applied thereto.

As a consequence of this conversion from linear to logarithmic form, the output levels of logarithmic amplifier 30 are proportionally larger for the small system input signal (i.e., sensor output signal) variations than for large input signal variations. The train of pulses emanating from amplifier 30 is applied to an accumulative adder 32 which serves to sum the output pulses that have occurred during a complete scan of the sensors in strip 10 by commutator 13. To that end, adder 32 is "strobed" by the series of strobe pulses from clock 14, and a reset pulse is applied to the adder when the commutator reaches the end of each complete scan of the strip or line of sensors. Sign, or polarity, information is obtained by adder 32 from absolute value circuit 27, to permit the adder to perform its accumulation function in accordance with the appropriate polarity of the incoming pulses from amplifier 30.

The reset pulse is applied to the accumulative adder 32 each time commutator 13 completes a scan of sensor strip 10. The level to which the adder output is reset is predetermined to take into account such factors as average scene light level, desired output voltage level, and other appropriate parameters. This resetting of the accumulator from line to line (i.e., from sensor strip scan to sensor strip scan) is necessary to maintain an arbitrarily preselected range of output signal level, because of the contrast enhancement technique of this invention (which produces an acceptable distortion of the input signal to provide a desired modified output signal). In particular, without the reset an overall reference or "zero" level would not be present at the beginning of each scan unless, as a matter of coincidence, the sum of the increase output terms should equal to the sum of the decrease output terms.

The signal level output of accumulator 32 varies on a pulse-to-pulse (and a sensor element-to-sensor element) basis, with the amount of this change being proportionally larger for small signal changes than for large signal changes in the energy detected by the sensors, and this is true regardless of whether the small signal change occurred at a high average signal level or a low signal level. A typical form of the output level of adder 32 is shown in FIG. 2F, assuming the previous set of waveforms, and this is converted to a return-to-zero (RTZ) level of the form shown in FIG. 2G by RTZ encoder 35. The latter unit is synchronized in operation with the timing of the commutator 13, flip-flop 20, subtractor 25, and adder 32, by clock pulses from clock 14. This RTZ output may then be utilized for display or for further processing.

Small input signal level changes are given greater emphasis by means of this signal processing technique than is the case where previously known techniques have been utilized. This may result in similar emphasis of any variations in the signal detector characteristics, but such variations were not always displayed using prior art techniques only because the variations tended to be swamped by the form of operation, which suppressed small signal changes detected by the sensor. In any event, avoidance of this difficulty is assured by merely using care, in the selection of sensors, to match the physical characteristics and detection capabilities of the sensors; by providing consistent biasing of the sensors, and by placement of the sensors to reduce differences attributable solely to environmental effects.

It is not essential to the invention that a strip sensor array be used of that any sensor array be used. Rather, the invention is applicable to XY imaging techniques using electron beam read sensors or solid state sensors, and also to such techniques as the processing of pulse trains for radar systems, or other systems in which the input data is available as a train of pulses.

It will be observed that operation of the system of FIG. 1 in providing enhancement of small signal variations constitutes a form of correlation of two signals. The first of these signals is the output of every other element (e.g., 1, 3, 5, . . . etc.) in a line of sensing elements. However, the first signal might instead be a pulse train from a single source having a preselected relationship to another pulse train derived from a similarly-situated source having the same or substantially the same signal detecting or signal generating characteristics as the first source. The second signal is the latter pulse train and is derived from the remaining sensing elements of the array. The object of such processing is to determine the extent to which the two signals are alike, or are similar. According to the present invention, slight variations in signal level are emphasized (and the information contained therein is thereby more readily extracted) by sampling and storing energy from the two signals in separate stores, comparing the separately accumulated contents during each sampling interval, generating a logarithmic representation of the running difference, if any, between the two, summing the logarithmic variations at the sampling rate, and finally, converting the summed levels to a desire form, depending upon the type of display or upon subsequent processing to be performed, with a known reference or datum level. Again, it is not essential that a multiplicity of sensors be involved, since quite clearly the two pulse trains may emanate from two (or perhaps even only one) detectors, the important points being that some known or determinable temporal relationship exist between the two pulse trains, and that they originate in a common spatial region or source (such as a single scene or image).

While we have described a preferred embodiment of our invention, it should be apparent that variations may be implemented by those of ordinary skill without departing from the spirit of the invention.

We claim as our invention:

1. Apparatus for enhancing small signal level variations occurring relative to background levels, said apparatus comprising:
   an array of sensing elements responsive to energy of a form which may consist of both information and environmental background, for generating electrical signals functionally related to the respective levels of incident energy,
   means for generating a train of timing pulses,
   means responsive to said timing pulses for sequentially sampling the signals generated by the sensing elements of said array,
   parallel channel means responsive, in accordance with said timing pulses, to adjacent signal samples appearing in said sequence for detecting difference in level of said adjacent samples, and
   means responsive to the detected difference in level of said samples for conversion of the level variations to logarithmic form to emphasize small signal variations relative to large signal variations.

2. The invention according to claim 1 wherein said parallel channel means includes:
   a first channel and a second channel connected for parallel processing of said signal samples, each of said channels including
   means for retaining the level of a signal sample applied thereto, over an interval of time from application of that sample to application of the next sample to said retaining means, and
   switch means, responsive when energized, for selectively applying samples to said retaining means; and
   means coupled to said first and second channels and responsive to said timing pulses for alternately energizing said switch means in both of said channels so that samples in said sequence are applied alternately to the retaining means of the two channels.

3. The invention according to claim 2 wherein said parallel channel means further includes
   means responsive to the levels present in the retaining means of both channels during each said interval for deriving the difference therebetween as a measure of said variations in level.

4. The invention according to claim 3 wherein said logarithmic conversion means includes
   means responsive to said difference in level during each said interval, for deriving the absolute value of said difference and the sense of the difference, and
   logarithmic amplifier means responsive to said absolute value for logarithmic amplification thereof.

5. The invention according to claim 4 further including means, comprising
   means responsive to successive representations of logarithmic absolute values of said level differences for summation thereof in accordance with the sense of the respective differences, and
   means responsive to the summation of said successive logarithmic representations at intervals consonant with said timing pulses for referencing the summations at those intervals to a preselected datum level.

6. A system for extracting information from a train of pulses, comprising
   a pair of channels connected for parallel reception of pulses in said train,
   means synchronized with the timing of the pulses in said train for selectively completing a circuit path in each of said channels in alternation, for alternating passage of pulses in said train therethrough,
   each said channel including means for sensing energy in a pulse applied thereto and for retaining a signal level representative of that energy,
   means responsive to signal levels stored by said retaining means in both channels for detecting the difference in levels therebetween at intervals based on said timing of said pulses, means responsive to each difference in level detected by said detecting means for conversion of each difference level to a representative logarithmic value, and means for accumulating said conversion values in accordance with said timing of said pulses, as an indication of the information content in said train of pulses.

7. The system of claim 6 wherein said circuit path completing means completes circuit paths in a pair of channels to pass a first pulse in said train to one of said channels of said pair and the next consecutive pulse to the other channel of said pair, so that alternate ones of said pulses in said train are applied to said retaining means in said one channel and every other pulse is supplied to said retaining means in said other channel, in accordance with the order of occurrence in said train.

8. The system of claim 7 wherein said accumulating means comprises means for adding the logarithmic representations generated by said conversion means, at intervals based on said timing of said pulses, and further including means for referencing the added logarithmic representations at said intervals, to a predetermined datum level.

9. The system of claim 6 wherein is further provided an array of photosensors responsive to incident light to generate electrical signals respectively representative thereof, and means for sequentially scanning the outputs of said photosensors to produce said train of pulses.

* * * * *